UNITED STATES PATENT OFFICE.

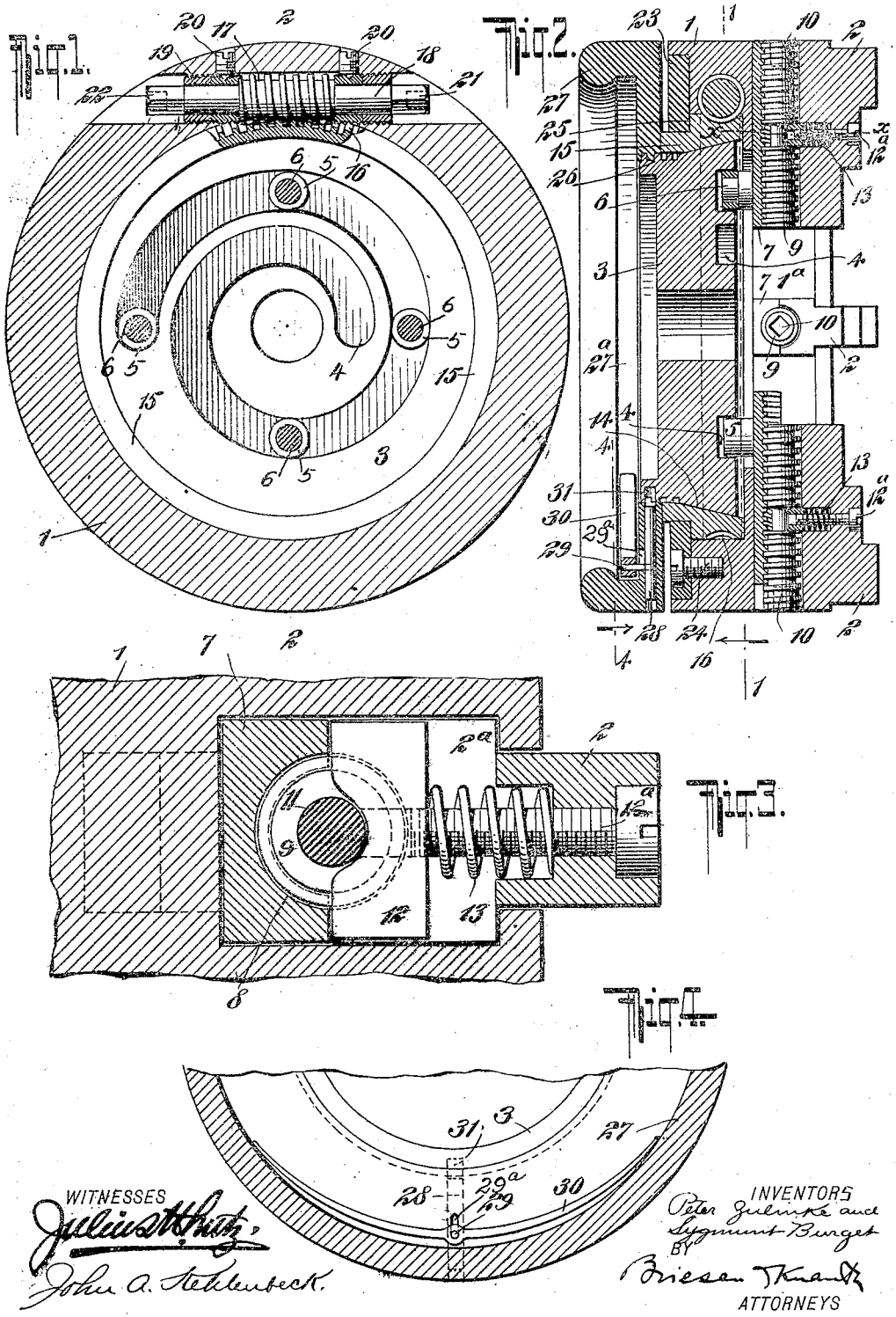

PETER ZULINKE, OF ELIZABETH, AND SYGMUNT BURGET, OF JERSEY CITY, NEW JERSEY.

CHUCK.

No. 860,781.   Specification of Letters Patent.   Patented July 23, 1907.

Application filed June 12, 1906. Serial No. 321,350.

*To all whom it may concern:*

Be it known that we, PETER ZULINKE, a subject of the Emperor of Austria-Hungary, and a resident of Elizabeth, in the county of Union and State of New Jersey, and SYGMUNT BURGET, a subject of the Emperor of Austria-Hungary, and a resident of Jersey City, in the county of Hudson and State of New Jersey, have invented certain new and useful Improvements in Chucks, of which the following is a specification.

Our invention relates to chucks and has for its object to provide means for adjusting the jaws individually and for quickly setting all of said jaws simultaneously.

Other objects of our invention will appear from the annexed description and the features of novelty will be pointed out in the appended claims.

Reference is to be had to the accompanying drawings in which

Figure 1 is a sectional view of our improved clutch on the line 1—1 of Fig. 2; Fig. 2 is a sectional view thereof on line 2—2 of Fig. 1; Fig. 3 is a partial cross section substantially on line X—X of Fig. 2, drawn upon an enlarged scale; and Fig. 4 is a section on line 4—4 of Fig. 2.

1 is the jaw-holding member or body of the chuck provided with radial slideways $1^a$ for the movable jaws 2.

3 is a rotatable disk provided with a spiral slot 4, the purpose of which will be more fully described hereinafter.

5 are rollers located on studs 6 which form part of or are secured to the jaw-bearing members 7. These rollers 5 are adapted to travel in the spiral slot 4 of the disk 3. The jaw-bearing members 7 are adapted to slide in the rear part of the guideways $1^a$ and are provided with semi-circular screw-threaded portions 8, adapted for engagement with the screw-threaded spindles 9 provided with angular sockets 10. These spindles 9 are provided with reduced portions 11 arranged to receive the coupling members or blocks 12, which are secured in position on each of the jaws 2. Spiral springs 13 serve to maintain the blocks 12 in position in engagement with the reduced portions 11. Thus when it is desired to adjust the jaws individually or relatively to each other a suitable tool is inserted in the sockets 10 and the spindles 9 are rotated. This results in the spindles 9 working up or down on the screw-threaded portions 8 of the members 7, the jaws 2 being carried along with said spindles through the medium of the blocks 12 and their connection with said jaws. By turning the screw $12^a$ which engages the block 12, the latter may be withdrawn, against the tension of the spring 13, into a recess $2^a$, clear of the spindle 9, so as to allow the jaw to be removed quickly by sliding it outward.

The following mechanism is provided for the purpose of setting all of the jaws simultaneously:

The disk 3 is beveled at 14 which beveled portion is surrounded by a wedge ring 15 having a corresponding beveled inner surface. The ring 15 is further provided with worm teeth 16 which are arranged to mesh with a worm screw 17 provided with reduced portions 18 journaled in bushings 19 which are suitably secured in position on the chuck body 1 by means of screws 20. The worm screw 17 is also provided at each end with angular portions 21 having angular sockets 22. The wedge ring 15 is prevented from moving laterally with respect to the chuck body 1 by means of a ring 23 secured to said chuck body by means of screws 24. This ring 23 allows the ring 15 to be rotated for the purpose to be more fully described hereinafter, the said ring 15 being provided with a shoulder 25 which engages the ring 23. The disk 3 is screw-threaded at 26 to receive the screw-threaded clamping ring 27 which is adapted to be screwed up against the ring 15.

By screwing the clamping ring 27 up tightly against the wedge ring 15 the latter is forced up on the bevel 14 of the disk 3, and the disk 3, the ring 15 and the ring 27 are securely locked together. If a proper key is now inserted into one of the sockets 22, or over one of the angular portions 21, and turned, the worm screw 17 will rotate the ring 15 and with it the disk 3 (and ring 27), thus through the medium of the spiral slot 4 and the rollers 5, bringing the jaws nearer to, or farther away from, each other according to the direction in which the worm screw 17 is rotated. With this arrangement it is possible to adjust the jaws very accurately. A rapid adjustment of the jaws is obtained in the following manner: The clamping ring 27 is provided with a radially sliding bolt 28 to which is secured a pin 29 which passes through a slot $29^a$ in the ring 27; a flat bow spring 30 is secured to this pin 29 and engages the ring 27 to each side of said pin within a groove $27^a$. The disk 3 is provided with a socket 31 into which the bolt 28 is adapted to snap when the member 27 is unscrewed slightly. This unscrewing of the ring 27 releases the ring 15 from the disk 3, and the said ring 27 being locked to the disk 3 through the medium of the bolt 28, it is possible to turn the body 1, with the wedge ring 15, by hand relatively to the disk 3 and thus secure a rapid adjustment of the jaws. During this turning of the body 1 and ring 15 by hand, the disk 3 is stationary and is not affected. When it is desired to release the bolt 28 from the socket, the spring 30 is pressed outward at the point where it engages the pin 29, which action releases the bolt 28 from the socket 31 as illustrated in Figs. 2 and 4, and allows the ring 27 to be screwed up against the ring 15, so that the jaws are held in their adjusted position.

With our invention it is thus possible to quickly set all of the jaws simultaneously and also to adjust the jaws individually and to lock said jaws in their adjusted position.

Various modifications may be made without departing from the spirit of our invention as defined in the claims.

We claim:

1. In a chuck, the combination with a body having slideways, of jaws movable in said slideways, a rotatable disk having a spiral for adjusting the jaws simultaneously and made with a beveled outer surface, a wedge ring engaging the said beveled surface, a clamping ring screwing on said rotatable disk to connect the wedge ring therewith or release it therefrom, a worm gearing interposed between the body and the wedge ring.

2. In a chuck, the combination of a body having slideways, jaw-bearing members movable in said slideways and provided with semi-circular screw-threaded sockets, screw spindles engaging said sockets, jaws, and releasable coupling devices for normally causing said jaws to move lengthwise with the spindles.

3. In a chuck, the combination of a body having slideways, jaws movable in said slideways, a rotatable disk having a beveled surface and provided with a spiral for adjusting the jaws simultaneously, a wedge ring engaging the beveled surface of the disk, worm gearing interposed between said wedge disk and the body, a clamping ring screwing on said disk to connect said wedge ring with the disk or release it therefrom, and means for locking the clamping ring to the said disk in the releasing position of the clamping ring.

4. In a chuck, the combination of a body having slideways, jaws movable in said slideways, a rotatable disk having a beveled surface and provided with a spiral for adjusting the jaws simultaneously, a wedge ring engaging the beveled surface of the disk, worm gearing interposed between said wedge disk and the body, a clamping ring screwing on said disk to connect said wedge ring with the disk or release it therefrom, and a spring-pressed pin carried by the clamping ring and adapted for locking engagement with said disk.

5. In a chuck, the combination of a body having a slideway, a jaw-bearing member, movable in said slideway, and having a screw-threaded socket, a screw spindle located in said socket, a jaw and a movable and releasable spring-pressed coupling member which normally compels the jaw to follow the lengthwise movement of the spindle.

6. In a chuck, the combination of a body having slideway, a jaw-bearing member, movable in said slideway and each provided with a screw-threaded socket, a screw spindle located within each socket, jaws, coupling blocks carried by said jaws and movable transversely into and out of engagement with each of said spindles, and means for normally holding each of said coupling blocks in engagement with each screw spindle.

7. In a chuck, the combination of a body having slideways, bearing members movable in said slideways and each having a screw-threaded socket, a screw spindle located in each of said sockets and provided with a reduced portion, jaws, and spring-pressed coupling blocks carried by said jaws and movable into and out of engagement with the reduced portion of each of said spindles.

PETER ZULINKE.
SYGMUNT BURGET.

Witnesses:
JOHN LOTKA,
EUGENE EBLE.